US010844816B2

(12) United States Patent
Bartl et al.

(10) Patent No.: US 10,844,816 B2
(45) Date of Patent: Nov. 24, 2020

(54) AIR FILTER DEVICE FOR A MOTOR VEHICLE

(71) Applicant: Bayerische Motoren Werke Aktiengesellschaft, Munich (DE)

(72) Inventors: Johannes Bartl, Linz (AT); Volker Raab, Neuzeug (AT); Christian Debevec, Waldneukirchen (AT); Werner Baumgartner, Garsten (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 111 days.

(21) Appl. No.: 16/032,524

(22) Filed: Jul. 11, 2018

(65) Prior Publication Data
US 2018/0320644 A1 Nov. 8, 2018

Related U.S. Application Data

(63) Continuation of application No. PCT/EP2016/078413, filed on Nov. 22, 2016.

(30) Foreign Application Priority Data

Jan. 15, 2016 (DE) .................. 10 2016 200 417

(51) Int. Cl.
*F02M 35/08* (2006.01)
*F02B 29/04* (2006.01)
(Continued)

(52) U.S. Cl.
CPC ....... *F02M 35/088* (2013.01); *F02B 29/0431* (2013.01); *F02B 29/0475* (2013.01);
(Continued)

(58) Field of Classification Search
CPC ............ F02M 35/088; F02M 35/0204; F02M 35/0209; F02M 35/024; F02M 35/002;
(Continued)

(56) References Cited

U.S. PATENT DOCUMENTS 5,400,753 A 3/1995 Andress et al.
7,393,372 B2 7/2008 Cassell et al.
(Continued)

FOREIGN PATENT DOCUMENTS

DE 93 07 147 U1 7/1993
DE 199 26 135 A1 12/2000
(Continued)

OTHER PUBLICATIONS

International Search Report (PCT/ISA/210) issued in PCT Application No. PCT/EP2016/078413 dated Feb. 10, 2017 with English translation (seven pages).
(Continued)

*Primary Examiner* — Syed O Hasan
(74) *Attorney, Agent, or Firm* — Crowell & Moring LLP

(57) ABSTRACT

An air filter device for a motor vehicle is provided with a filter housing having an air inlet and an air outlet, a filter insert which is received in the filter housing and divides the inside of the filter housing into an untreated air section and a pure air section, and a bypass line for supplying air into the untreated air section. The bypass line extends from a connection opening in the filter housing to a cooler, especially a charge air cooler of the motor vehicle.

4 Claims, 3 Drawing Sheets

(51) Int. Cl.
*F02M 35/024* (2006.01)
*F02M 35/02* (2006.01)
*F02M 35/10* (2006.01)
*F02M 35/108* (2006.01)
*F02M 35/14* (2006.01)

(52) U.S. Cl.
CPC ...... *F02M 35/024* (2013.01); *F02M 35/0204* (2013.01); *F02M 35/0209* (2013.01); *F02M 35/082* (2013.01); *F02M 35/108* (2013.01); *F02M 35/10163* (2013.01); *F02B 29/0418* (2013.01); *F02M 35/14* (2013.01); *Y02T 10/144* (2013.01); *Y02T 10/146* (2013.01)

(58) Field of Classification Search
CPC ........... F02M 35/10163; F02M 35/108; F02M 35/10222; F02M 35/10268; F02B 29/0431; F02B 29/0475
See application file for complete search history.

(56) References Cited

U.S. PATENT DOCUMENTS

| | | | | |
|---|---|---|---|---|
| 9,032,939 B2* | 5/2015 | Glugla | ................ | F02D 41/0002 123/563 |
| 9,062,639 B1 | 6/2015 | MacKenzie et al. | | |
| 9,222,448 B2* | 12/2015 | Ghorpade | ............ | F02M 35/164 |
| 2002/0104330 A1* | 8/2002 | Klingler | ................... | B60H 3/06 62/317 |
| 2006/0272622 A1 | 12/2006 | Acuna et al. | | |
| 2009/0084344 A1* | 4/2009 | Fasan | ................... | F02M 35/024 123/198 E |
| 2010/0186354 A1 | 7/2010 | Braithwaite | | |
| 2013/0019833 A1 | 1/2013 | Li et al. | | |
| 2016/0312748 A1* | 10/2016 | Bruestle | .............. | F02B 29/0475 |

FOREIGN PATENT DOCUMENTS

| | | |
|---|---|---|
| DE | 10 2012 211 251 A1 | 1/2013 |
| JP | 11-315762 A | 11/1999 |
| WO | WO 03/074849 A1 | 9/2003 |

OTHER PUBLICATIONS

German-language Written Opinion (PCT/ISA/237) issued in PCT Application No. PCT/EP2016/078413 dated Feb. 10, 2017 (five pages).

German-language Search Report issued in counterpart German Application No. 10 2016 200 417.4 dated Sep. 26, 2016 with partial English translation (11 pages).

Chinese-language Office Action issued in counterpart Chinese Application No. 201680059199.2 dated Aug. 22, 2019 with English translation (18 pages).

* cited by examiner

AIR FILTER DEVICE FOR A MOTOR VEHICLE

CROSS REFERENCE TO RELATED APPLICATIONS

This application is a continuation of PCT International Application No. PCT/EP2016/078413, filed Nov. 22, 2016, which claims priority under 35 U.S.C. § 119 from German Patent Application No. 10 2016 200 417.4, filed Jan. 15, 2016, the entire disclosures of which are herein expressly incorporated by reference.

BACKGROUND AND SUMMARY OF THE INVENTION

The invention relates to an air-filter device for a motor vehicle, having a filter housing, which has an air inlet and an air outlet, and a filter insert, which is accommodated in the filter housing and subdivides the interior of the filter housing into an unfiltered-air portion and a clean-air portion.

Such air-filter devices are generally known from the prior art and are used, for example, in motor vehicles in order to clean air which is taken in by an internal combustion engine of the motor vehicle and to ensure a satisfactory combustion process. A continuous feed of air is vital here for the functioning of the internal combustion engine.

As the temperature of the air which is fed to the internal combustion engine decreases, the mass of air in a predetermined volume of air increases, which results in a higher performance of the internal combustion engine. An air inlet of the air-filter device is therefore arranged in the engine compartment, usually upstream—as seen in relation to the travel-induced airflow—of cooling devices such as an engine radiator, a charge-air cooler or an air-conditioner condenser, so that the air taken in is as cold as possible.

In the event of heavy snowfall or of snow drifts, the fact that the air inlet is exposed at the front may result in ice and/or snow passing into the unfiltered-air portion of the filter housing and clogging up, or icing up, the filter insert there, in which case it is possible for the internal combustion engine to take in only a very small amount of air, if any at all, via the air-filter device.

The object of the invention is to create an air-filter device for a motor vehicle which, even in the event of a filter insert being clogged up by snow or ice, allows air to be taken in by the internal combustion engine and therefore ensures at least emergency operation of the internal combustion engine.

This and other objects are achieved according to the invention by an air-filter device for a motor vehicle, having a filter housing, which has an air inlet and an air outlet, a filter insert, which is accommodated in the filter housing and subdivides the interior of the filter housing into an unfiltered-air portion and a clean-air portion, and a bypass line for feeding air into the unfiltered-air portion. The bypass line extends from a connection opening in the filter housing to a cooler, in particular a charge-air cooler of the motor vehicle. This means that air which is heated by the (charge-air) cooler can be taken in by the internal combustion engine via the bypass line. This heated air is essentially free of snow and ice, and therefore the filter insert does not become clogged up, nor does it ice up. The bypass line therefore ensures a basic supply of air to the internal combustion engine and, accordingly, at least emergency operation of the engine.

In one embodiment of the air-filter device, the filter housing has a housing channel between the connection opening and the filter insert. By way of this housing channel, the air which is taken in via the bypass line is not mixed with that air which is taken in via an air inlet of the air-filter device, said air inlet being arranged upstream of the cooling devices, and, in some circumstances, is laden with snow and/or ice.

The filter insert preferably has a bypass portion, which is directly adjacent to the housing channel. This bypass portion is assigned, in particular, exclusively to the bypass line and is therefore "reserved" for largely snow-free, hot intake air. It is possible here for a channel wall of the housing channel to butt directly against the filter insert in order to separate off the bypass portion from the rest of the intake air and to prevent the bypass portion from clogging up or icing up as a result of the rest of the intake air.

According to a further embodiment of the air-filter device, the housing channel has a flap, which can release or block an air flow in the housing channel. The flap here is spring-biased, in particular, into its blocking position and, from a predeterminable negative pressure in the unfiltered-air portion onward, moves in the direction of its release position. Such a flap ensures that, in the case of a non-clogged, ice-free filter insert, the internal combustion engine is fed the coolest possible ambient air via the air inlet of the air-filter device, said air inlet being arranged upstream of the cooling devices. Air intake via the bypass line, impairing the engine performance, is only enabled when a predeterminable negative pressure indicative of the filter insert being clogged up or iced up is established in the unfiltered-air portion.

According to a preferred embodiment, the air-filter device is designed in the form of an intake muffler, wherein there are different design measures possible for reducing the intake noise. For example, the filter housing is designed in the form of a resonator-type muffler, the filter insert performing, in addition, a slight absorption action. Further, usually far more pronounced absorption of the intake noise can be realized by a so-called intake snorkel, as is already known from the prior art.

The invention also comprises an air-supply assembly for an internal combustion engine of a motor vehicle, having the above-described air-filter device and an air-cooled charge-air cooler for cooling combustion air which is to be fed to the internal combustion engine. The charge-air cooler has an air-inlet side and an air-outlet side for cooling air, and it is possible for cooling air to flow through said cooler in an air-flow direction. One end of the bypass line, said end being assigned to the charge-air cooler, is adjacent to the air-outlet side of the charge-air cooler.

According to an embodiment of the air-supply assembly, the charge-air cooler has a combustion-air inlet, which is in flow connection with a combustion-air outlet via cooling ribs around which cooling air flows. That end of the bypass line which is assigned to the charge-air cooler is arranged closer to the combustion-air inlet than to the combustion-air outlet. The compressor arranged upstream means that the temperature of the combustion air is greatest at the combustion-air inlet of the charge-air cooler. Therefore, the ambient air used as cooling air absorbs heat energy most of all in this region, and therefore any snow or ice particles possibly carried along in the cooling air are melted. This easily heated, in particular snow-free and ice-free, cooling air is particularly suitable for being taken in via the bypass line, and fed to the internal combustion engine, in the event of the filter insert of the air-filter device being clogged up or iced up.

It is particularly preferable for that end of the bypass line which is assigned to the charge-air cooler to be arranged on a periphery of the air-outlet side which is adjacent to the combustion-air inlet. This peripheral arrangement ensures that the hottest, and therefore also the most likely snow-free and ice-free, cooling air is taken in from the internal combustion engine via the bypass line. A situation where the filter insert clogs up or ices up on account of the cooling air taken in via the bypass line is thus largely ruled out.

According to a further embodiment of the air-supply assembly, a fan is provided adjacent to the air-outlet side of the charge-air cooler. The fan forces the cooling air in the air-flow direction and has a fan wheel and a fan frame, wherein that end of the bypass line which is assigned to the charge-air cooler is fastened on the fan frame and is in flow connection with the air-outlet side of the charge-air cooler via an opening in the fan frame. This ensures straightforward and reliable installation of the bypass line at an end which is assigned to the charge-air cooler.

In this embodiment, the fan frame may have a flap, which can release or block the opening in the fan frame. The flap here is spring-biased, in particular, into its blocking position and, from a predeterminable negative pressure in the unfiltered-air portion onward, moves in the direction of its release position. Such a flap ensures that, in the case of a non-clogged, ice-free filter insert, the internal combustion engine is fed the coolest possible ambient air via the air inlet of the air-filter device, said air inlet being arranged upstream of the cooling devices. Air intake via the bypass line, impairing the engine performance, is only enabled when a predetermined negative pressure indicative of the filter insert being clogged up or iced up is established in the unfiltered-air portion.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
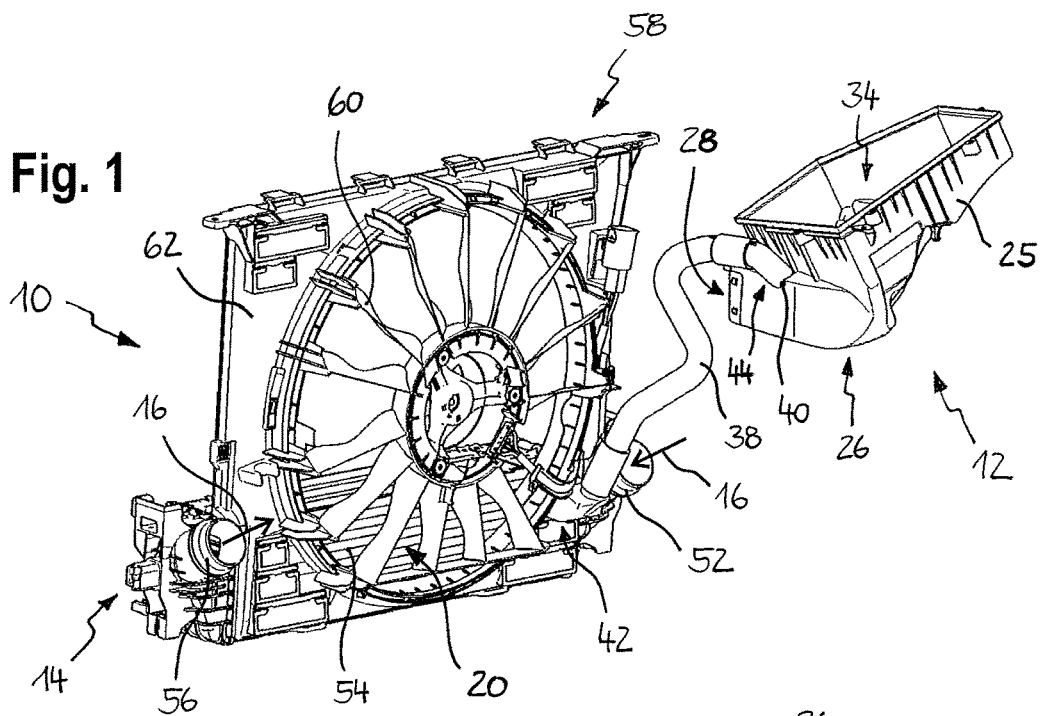
FIG. 1 is a perspective view of an air-supply assembly according to an embodiment of the invention having an air-filter device according to an embodiment of the invention.
Figure 2:
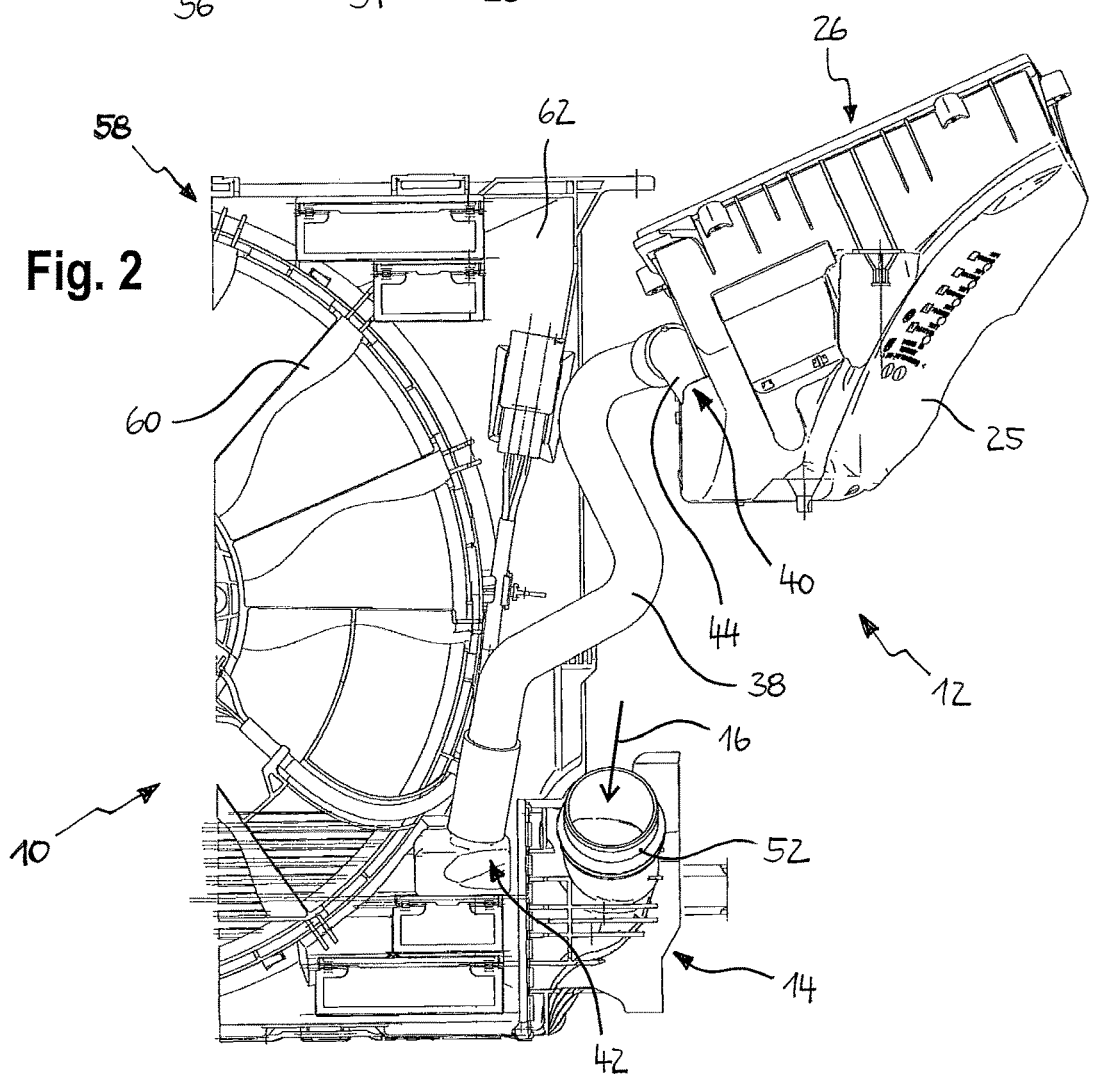
FIG. 2 shows a detail of the air-supply assembly according to FIG. 1 in the region where a bypass line is connected to a fan.
Figure 3:
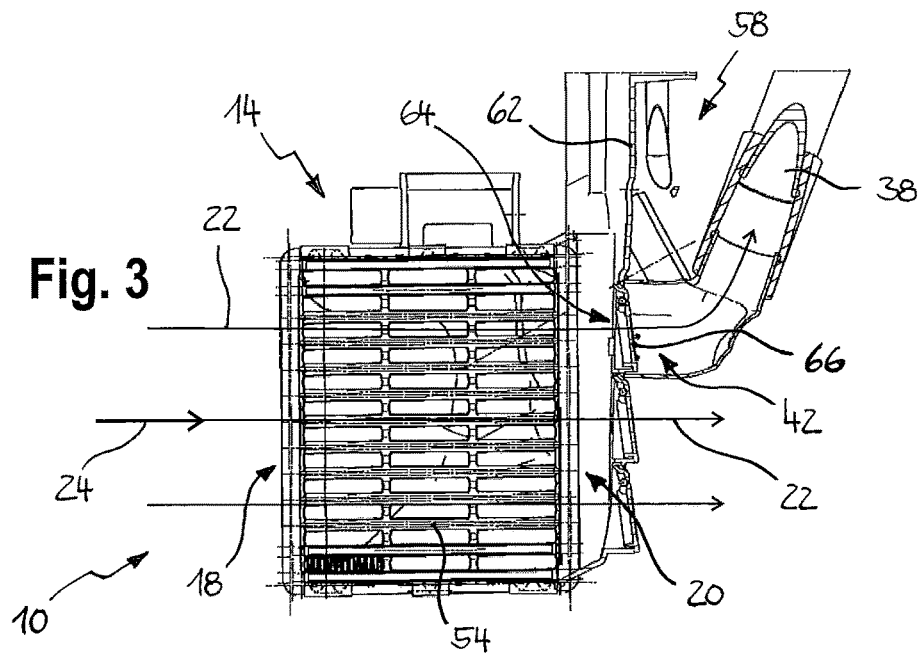
FIG. 3 shows a detail-specific section through the air-supply assembly according to FIG. 1 in the region where a bypass line is connected to a fan.

FIGS. 1 to 3 show an air-supply assembly 10 for an internal combustion engine of a motor vehicle, having an air-filter device 12, which is illustrated in more detail in FIGS. 4 to 7, and an air-cooled charge-air cooler 14 for cooling combustion air 16 which is to be fed to the internal combustion engine. The charge-air cooler 14 has an air-inlet side 18 and an opposite air-outlet side 20 for cooling air 22 and it is possible for cooling air 22 to flow through said cooler, according to FIG. 3, in an air-flow direction 24.

The air-filter device 12 comprises a filter housing 26, which has an air inlet 28 and an air outlet 30, a filter insert 32, which is accommodated in the filter housing 26 and subdivides the interior of the filter housing 26 into an unfiltered-air portion 34 and a clean-air portion 36, and a bypass line 38 for feeding air into the unfiltered-air portion 34.

Figure 6:
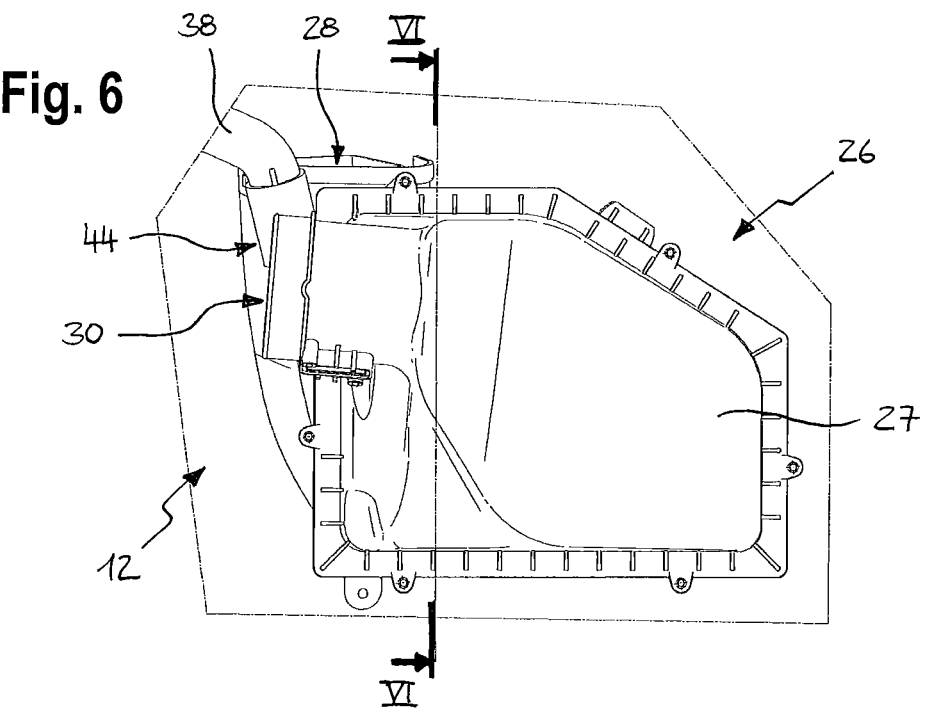
FIG. 6 is a plan view of the air-filter device according to an embodiment of the invention in the assembled state.
Figure 7:
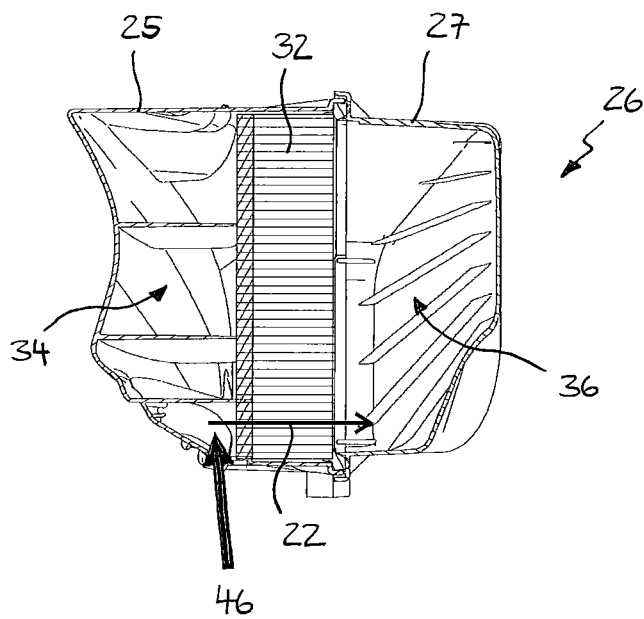
FIG. 7 shows a section VI-VI taken through the air-filter device according to FIG. 6.

In the present exemplary embodiment, the filter housing 26 is of two-part design and has a pan-like housing base 25 and a housing cover 27 (see FIGS. 6 and 7). The air inlet 28 is formed in the housing base 25 and the air outlet 30 is formed in the housing cover 27.

The bypass line 38 extends, according to FIG. 1, from a connection opening 40 in the filter housing 26, specifically in the housing base 25, to a cooler of the motor vehicle.

In the exemplary embodiment illustrated, the cooler is a charge-air cooler 14 of the motor vehicle, since hot combustion air 16, which has to be cooled by ambient air used as cooling air 22, flows particularly rapidly through said charge-air cooler. This means that cooling air 22 which is already heated shortly after start up of the motor vehicle is present on the air-outlet side 20 of the charge-air cooler 14. However, it would also be possible, in principle, for the cooler to be an engine radiator or an air-conditioner condenser.

In order to take up cooling air 22 which is heated in the charge-air cooler 14, one end 42 of the bypass line 38, said end being assigned to the charge-air cooler 14, is adjacent to the air-outlet side of the charge-air cooler 14. In contrast, an opposite end 44 of the bypass line 38, said end being assigned to the filter housing 26, is connected to the unfiltered-air portion 34 via the connection opening 40 of the filter housing 26, so that the unfiltered-air portion is fed the heated cooling air 22 from the air-outlet side 20 of the charge-air cooler 14.

Figure 4:
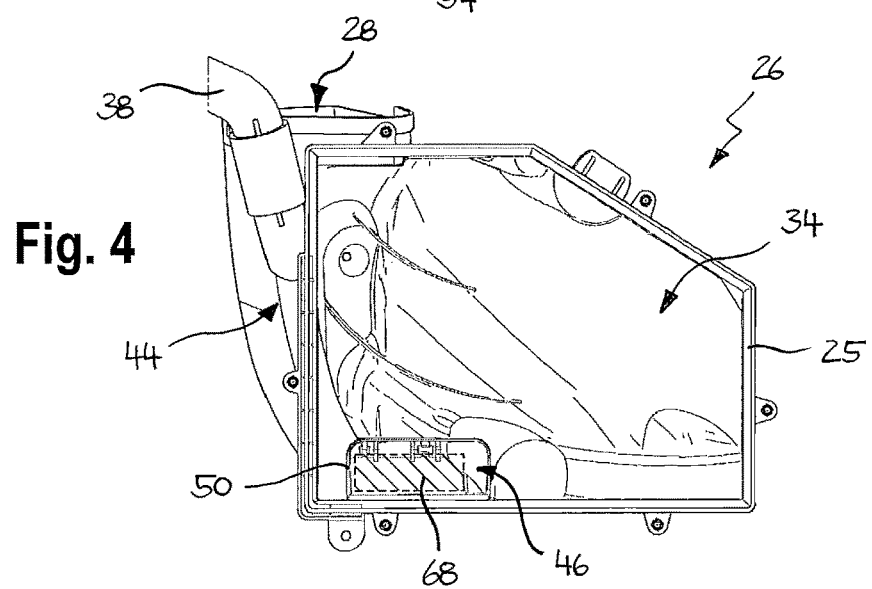
FIG. 4 is a plan view of an open filter housing of the air-filter device according to an embodiment of the invention.

As indicated in FIG. 4, the housing base 25 of the filter housing 26 has a housing channel 46 between the connection opening 40 and the filter insert 32 in order to channel the heated cooling air 22 from the bypass line 38, through the unfiltered-air portion 34, directly to the filter insert 32.

Figure 5:
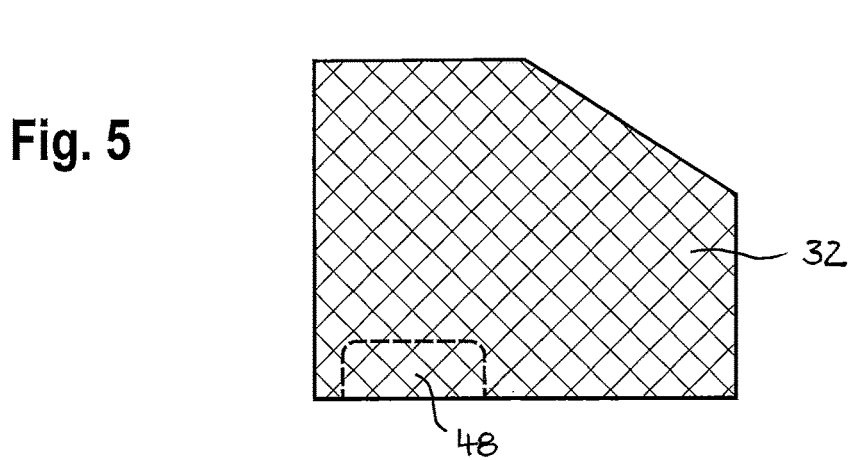
FIG. 5 is a plan view of a filter insert of the air-filter device according to an embodiment of the invention.

FIG. 5 shows a plan view of the filter insert 32 with a bypass portion 48 (shown clearly by dashed lines), which is directly adjacent to the housing channel 46 of the filter housing 26. This bypass portion 48 is assigned (exclusively) to the bypass line 38 and is therefore "reserved" essentially for snow-free, hot cooling air 22 from the bypass line 38. In order to prevent mixing with the intake air in the unfiltered-air portion 34 which, in some circumstances, is laden with snow or ice particles, it is possible for a channel wall 50 of the housing channel 46 to butt directly against the filter insert 32 in order to separate off the bypass portion 48 from the rest of the filter insert 32. This means that the bypass line 38, the housing channel 46 and the bypass portion 48 ensure at least emergency supply of cooling air 22 to the internal combustion engine, in which case this cooling air 22 is used as intake or combustion air 16.

It is clear with reference to FIG. 1 that the charge-air cooler 14 has a combustion-air inlet 52, which is in flow connection with a combustion-air outlet 56 via cooling ribs 54 around which cooling air flows, wherein the end 42 of the bypass line 38, said end being assigned to the charge-air cooler 14, is arranged closer to the combustion-air inlet 52 than to the combustion-air outlet 56. In specific terms, the end 42 of the bypass line 38, said end being assigned to the charge-air cooler 14, is even arranged directly on a periphery of the air-outlet side 20 of the charge-air cooler 14, said periphery being adjacent to the combustion-air inlet 52 (see FIG. 2).

The cooling air 22 flowing through the charge-air cooler 14 in the air-flow direction 24 can absorb heat energy from the inflowing, hot combustion air 16 most of all in the vicinity of the combustion-air inlet 52 and thus melts any snow or ice particles possibly carried along. Consequently, the bypass line 38, which is arranged in the vicinity of the combustion-air inlet 52, ensures that the intake air flowing into the filter housing 26 via the bypass line 38 is essentially free of snow and ice.

As illustrated in FIGS. 1 to 3, a fan 58 is provided adjacent to the air-outlet side 20 of the charge-air cooler 14, said fan forcing the cooling air 22 in the air-flow direction 24 and having a fan wheel 60 and a fan frame 62. The end 42 of the bypass line 38, said end being assigned to the charge-air cooler 14, is fastened on the fan frame 62 and is in flow connection with the air-outlet side 20 of the charge-air cooler 14 via an opening 64 in the fan frame 62.

According to FIG. 3, the fan frame 62 has a flap 66, which can release or block the opening 64 in the fan frame 62. It is preferably the case that the flap 66 is spring-biased into its blocking position according to FIG. 3 and, from a predeterminable negative pressure in the unfiltered-air portion 34 of the air-filter device 12 onward, moves in the direction of its release position. This straightforwardly ensures that, during snow-free and ice-free, normal operation of the air-supply assembly 10, the flap 66 blocks intake of heated cooling air 22 via the bypass line 38. The feed of air for the internal combustion engine takes place via the air inlet 28 of the air-filter device 12, wherein the coolest possible ambient air is taken in, via said air inlet 28, from upstream of the cooler provided, in order to achieve particularly high engine performance. It is only when the negative pressure in the unfiltered-air portion 34 of the air-filter device 12 drops below a predetermined value that clogging up or icing up of the filter inset 32 is assumed and the bypass line 38 is released via the flap 66 so as to ensure reliable air supply to the internal combustion engine.

As an alternative, it is also possible for the housing channel 46 of the filter housing 26 to have a flap 68, which can release or block an air flow in the housing channel 46. In this case, the flap 66 on the fan frame 62, said flap being illustrated in FIG. 3, would then be permanently open or could be dispensed with.

In contrast to the flap 66, which is formed on the fan frame 62, the flap 68, which is formed in the filter housing 26, is accompanied, in particular, by acoustics-related advantages, as it minimizes intake noise.

In addition, it is possible for other design-related noise-damping measures which are generally known from the prior art to be taken in order to reduce undesired intake noise in the air-filter device 12. The air-filter device 12 is then, in this case, designed in the form of an intake muffler.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air-supply assembly for an internal combustion engine of a motor vehicle, comprising:
   an air-filter device, wherein the air-filter device includes:
   a filter housing, which has an air inlet and an air outlet;
   a filter insert, which is accommodated in the filter housing and subdivides an interior of the filter housing into an unfiltered-air portion and a clean-air portion; and
   a bypass line for feeding air into the unfiltered-air portion,
   wherein a first end of the bypass line is connected to a connection opening in the filter housing; and
   an air-cooled charge-air cooler for cooling combustion air which is to be fed to the internal combustion engine, the charge-air cooler having an air-inlet side and an air-outlet side for cooling air and it being possible for cooling air to flow through said cooler in an air-flow direction,
   wherein a second end of the bypass line is arranged directly on a periphery of the air-outlet side of the charge-air cooler,
   wherein the charge-air cooler has a combustion-air inlet, which is in flow connection with a combustion-air outlet of the charge-air cooler via cooling ribs around which cooling air flows, and
   wherein the second end of the bypass line is arranged closer to the combustion-air inlet than to the combustion-air outlet.

2. An air-supply assembly for an internal combustion engine of a motor vehicle, comprising:
   an air-filter device, wherein the air-filter device includes:
   a filter housing, which has an air inlet and an air outlet;
   a filter insert, which is accommodated in the filter housing and subdivides an interior of the filter housing into an unfiltered-air portion and a clean-air portion; and
   a bypass line for feeding air into the unfiltered-air portion,
   wherein a first end of the bypass line is connected to a connection opening in the filter housing; and
   an air-cooled charge-air cooler for cooling combustion air which is to be fed to the internal combustion engine, the charge-air cooler having an air-inlet side and an air-outlet side for cooling air and it being possible for cooling air to flow through said cooler in an air-flow direction,
   wherein a second end of the bypass line is arranged directly on a periphery of the air-outlet side of the charge-air cooler,
   wherein the periphery of the air-outlet side is adjacent to a combustion-air inlet of the charge-air cooler.

3. An air-supply assembly for an internal combustion engine of a motor vehicle, comprising:
   an air-filter device, wherein the air-filter device includes:
   a filter housing, which has an air inlet and an air outlet;
   a filter insert, which is accommodated in the filter housing and subdivides an interior of the filter housing into an unfiltered-air portion and a clean-air portion; and
   a bypass line for feeding air into the unfiltered-air portion,
   wherein a first end of the bypass line is connected to a connection opening in the filter housing;
   an air-cooled charge-air cooler for cooling combustion air which is to be fed to the internal combustion engine, the charge-air cooler having an air-inlet side and an air-outlet side for cooling air and it being possible for cooling air to flow through said cooler in an air-flow direction, wherein a second end of the bypass line is arranged directly on a periphery of the air-outlet side of the charge-air cooler, and a fan provided adjacent to the air-outlet side of the charge-air cooler, said fan forcing the cooling air in the air-flow direction and having a fan wheel and a fan frame, wherein the second end of the bypass line is fastened on the fan frame and is in flow connection with the air-outlet side of the charge-air cooler via an opening in the fan frame.

4. The air-supply assembly as claimed in claim 3, wherein the fan frame has a flap, which releases or blocks the opening in the fan frame.

\* \* \* \* \*